(12) United States Patent
Stasko

(10) Patent No.: US 12,196,187 B1
(45) Date of Patent: Jan. 14, 2025

(54) DRIVE SYSTEM WITH PENDULUM MECHANISM

(71) Applicant: Slavomir Stasko, Fairport, NY (US)

(72) Inventor: Slavomir Stasko, Fairport, NY (US)

(*) Notice: Subject to any disclaimer, the term of this patent is extended or adjusted under 35 U.S.C. 154(b) by 0 days.

(21) Appl. No.: 18/766,591

(22) Filed: Jul. 8, 2024

(51) Int. Cl.
*F03G 3/06* (2006.01)
*F03G 3/00* (2006.01)

(52) U.S. Cl.
CPC .............. *F03G 3/06* (2013.01); *F03G 3/096* (2021.08); *F05B 2220/7068* (2013.01)

(58) Field of Classification Search
CPC ...... F03G 3/06; F03G 3/096; F05B 2220/706; F05B 2220/7068
See application file for complete search history.

(56) References Cited

U.S. PATENT DOCUMENTS

| | | | |
|---|---|---|---|
| 3,703,653 | A | 11/1972 | Tracy et al. |
| 3,879,622 | A | 4/1975 | Ecklin |
| 3,935,487 | A | 1/1976 | Czerniak |
| 3,967,146 | A | 6/1976 | Howard |
| 7,235,909 | B2 | 6/2007 | Moe |
| 7,702,703 | B2 | 4/2010 | Koichi |
| 7,902,703 | B2 | 3/2011 | Ucer |
| 2006/0244327 | A1 | 11/2006 | Kundel |
| 2008/0122299 | A1 | 5/2008 | Cristoforo |
| 2012/0007448 | A1 | 1/2012 | Gosvener |
| 2015/0288236 | A1 | 10/2015 | Moore |
| 2017/0298910 | A1* | 10/2017 | Granger ............. F03G 7/08 |
| 2023/0396140 | A1 | 12/2023 | Stasko |

FOREIGN PATENT DOCUMENTS

| | | | |
|---|---|---|---|
| CN | 103138650 | | 6/2013 |
| EP | 0244376 | | 6/1992 |
| EP | 2732540 | | 7/2015 |
| KR | 20110087507 | A * | 8/2011 |
| WO | WO 2002/061277 | | 8/2002 |
| WO | WO 2005/031953 | | 4/2005 |
| WO | WO 2005/100787 | | 10/2005 |
| WO | WO 2008/009220 | | 1/2008 |
| WO | WO 2013/080194 | | 6/2013 |
| WO | WO 2017/020845 | | 2/2017 |
| WO | WO 2022/069668 | | 4/2022 |
| WO | WO 2023/239995 | | 12/2023 |

* cited by examiner

*Primary Examiner* — Phillip A Johnson

(57) ABSTRACT

A drive system for driving a piece of equipment includes a pendulum mechanism. The pendulum mechanism has a bob member, a connector member, and a pivot member, wherein the bob member is connected to the pivot member by the connector member in a manner that allows the bob member to swing about the pivot member. An equipment connecting mechanism is adapted to operatively connect the drive system to a piece of equipment so that the piece of equipment can be driven by the drive system. The bob member comprises a carriage that has a platform that supports a mass transfer mechanism, the mass transfer mechanism including a translating mass and a linear actuator adapted to translate the translating mass relative to the platform. Selective translation of the translating mass causes the bob member to swing in a pendulum motion or maintain a pendulum motion.

20 Claims, 13 Drawing Sheets

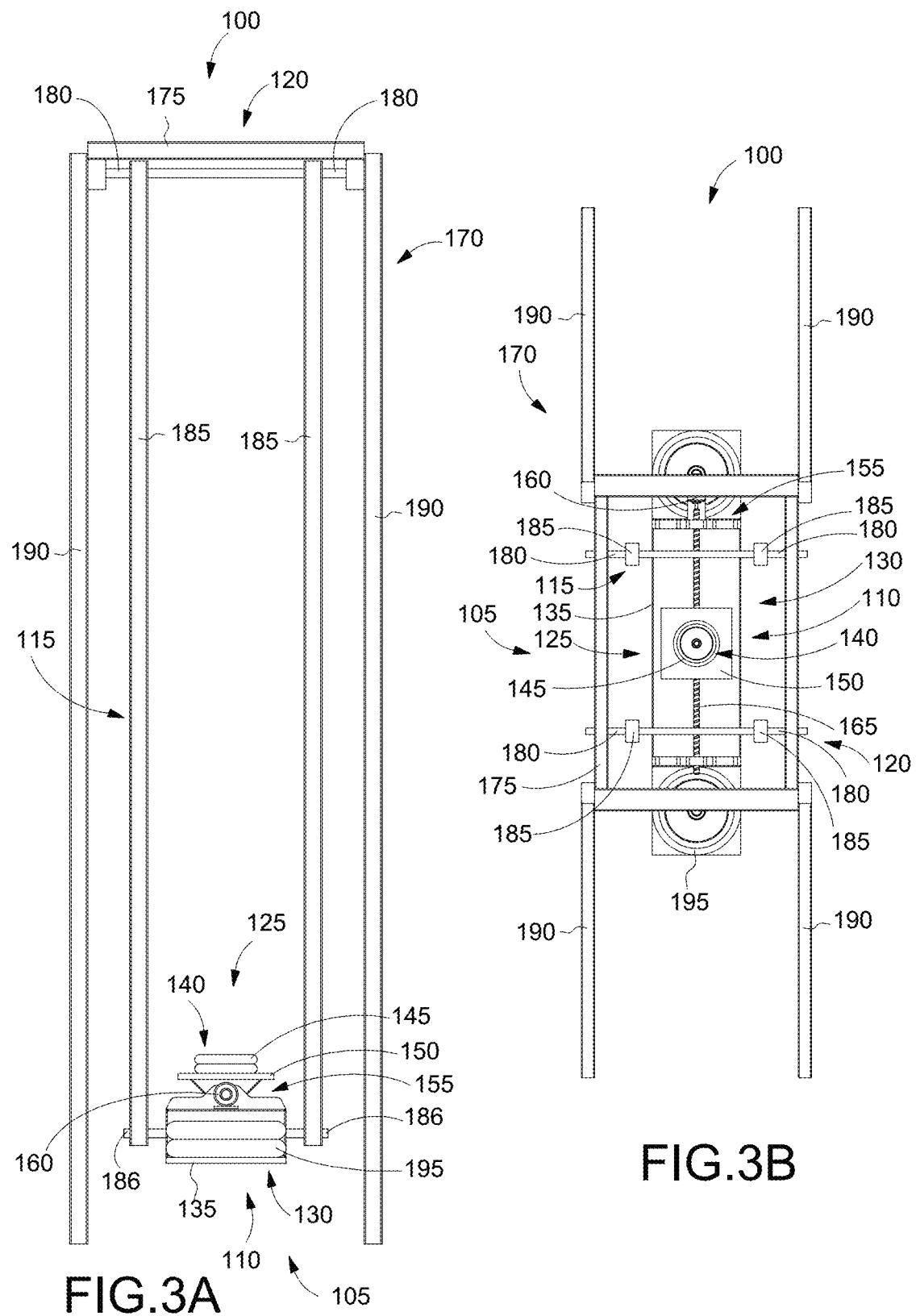

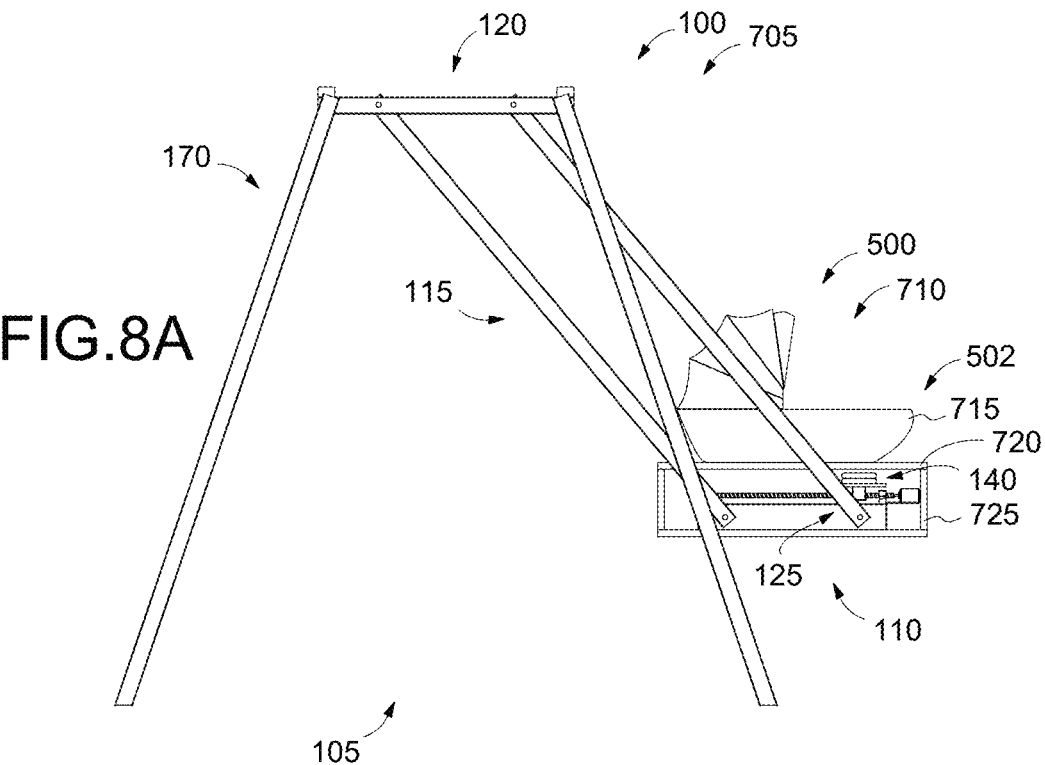
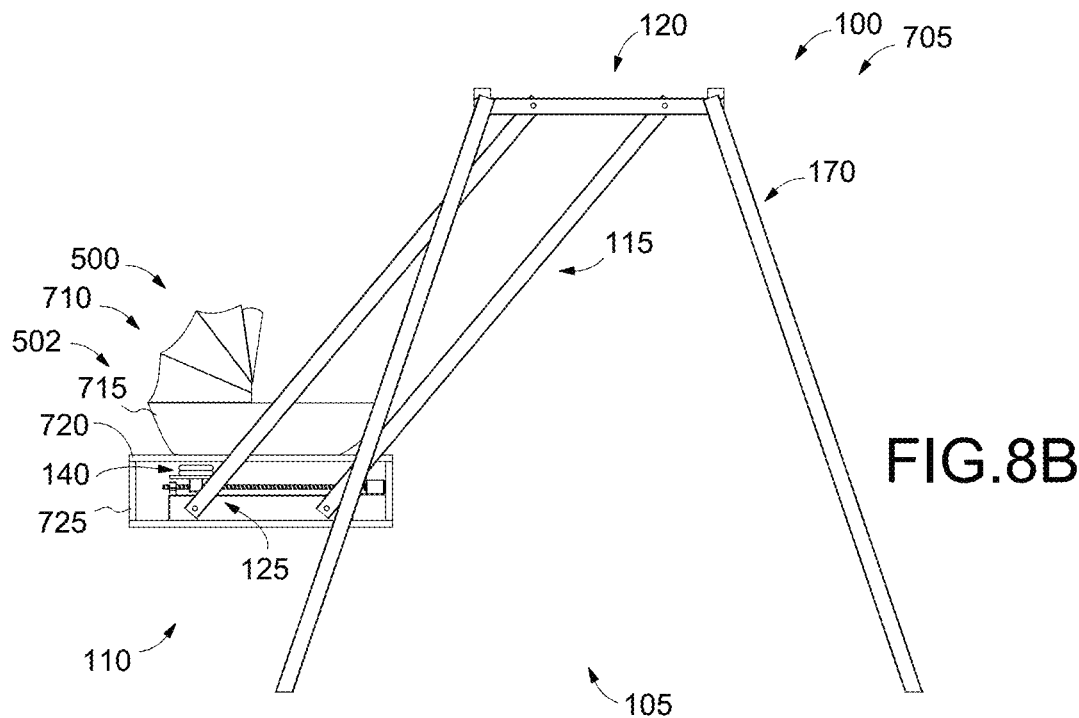

DRIVE SYSTEM WITH PENDULUM MECHANISM

BACKGROUND

In recent years, it has been increasingly important to find alternative energy sources and/or ways to supplement or augment conventional energy sources in a way that will make them more efficient in order to reduce the use of fossil fuels and their impact on climate change.

One way to reduce or more efficiently use energy is by taking advantage of physics. For example, solar power, wind power, and hydroelectric power have for decades been used to transform thermal, kinetic, or potential energy into a more useable and/or storable form of energy. More recently, other physical phenomena are being used to improve energy efficiency. For example, United States Patent Application 2023/0396140, which is incorporated herein by reference in its entirety, by the present inventor, discloses a system whereby magnetic forces from permanent magnets are used to transform a relative small amount of energy to a storable and/or or otherwise usable energy in an efficient manner.

Drive systems for equipment, especially large scale equipment, is a notoriously inefficient energy consumer. One such type of equipment is a pump, in particular a ground pump such as a pumpjack. A pumpjack, also known as a donkey pumper, oil horse, and a nodding donkey, is an above-ground drive for a reciprocating piston pump used to lift liquid out of an oil well. A beam-type pumpjack converts rotary motion of a motor to vertically reciprocating motion of a sucker rod in a hole. The motor is required to spin a heavy weight which causes a walking beam to move a horse head piece and thus a bridle connected the horse head in an up and down motion. This highly inefficient process consumes tremendous amounts of energy. Conventional pumpjacks are powered by fossil fuel generators or high current electricity.

While it is desirable to eliminate the need for fossil fuels entirely, until that is a reality, it is desirable to at least make their extraction as energy efficient as possible. This is not only good for the environment but also reduces the costs of extraction.

Therefore, there is a need for a more energy efficient drive system for equipment. There is a further need for a drive system that is capable of storing energy in an energy efficient manner. There is a further need for a drive system uses physics to reduce the amount of energy usage of the system.

SUMMARY

The present invention satisfies these needs. In one aspect of the invention, a drive system that takes advantage of a pendulum mechanism is provided.

In another aspect of the invention, a drive system for a piece of equipment uses a pendulum mechanism to drive or assist in driving the piece of equipment.

In another aspect of the invention, a drive system for a pump, such as a pumpjack, uses a pendulum mechanism to drive or assist in driving the pump.

In another aspect of the invention, a drive system for a swing uses a pendulum mechanism to drive or assist in driving the swing.

In another aspect of the invention, a drive system for an energy generator uses a pendulum mechanism to drive or assist in driving the energy generator.

In another aspect of the invention, a method of driving a piece of equipment comprises providing a drive system with a pendulum mechanism as described herein and using the drive system as described herein.

In another aspect of the invention, a drive system includes a pendulum mechanism that is powered by a mass transfer mechanism.

In another aspect of the invention, a drive system includes a pendulum mechanism that is powered by a mass transfer mechanism that comprises a translating mass and a linear actuator that translates the translating mass.

In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion.

In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, wherein the bob member swings from left to right, wherein the linear actuator causes the translating mass to translate from left to right in coordination with the swinging of the bob member, and wherein the linear actuator causes the translating mass to reverse its direction of translation before the bob member reaches its rightmost or leftmost position.

In another aspect of the invention, In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, and wherein the drive system is connected to a piece of equipment by the equipment connecting mechanism.

In another aspect of the invention, In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, wherein the drive system is connected to a piece of equipment by the equipment connecting mechanism, and wherein the piece of equipment is a pump.

In another aspect of the invention, In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, wherein the drive system is connected to a piece of equipment by the equipment connecting mechanism, and wherein the piece of equipment is a pumpjack.

In another aspect of the invention, In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, wherein the drive system is connected to a piece of equipment by the equipment connecting mechanism, and wherein the piece of equipment is a swing.

In another aspect of the invention, In another aspect of the invention, a drive system for driving a piece of equipment comprise a pendulum mechanism comprising a bob member, a connector member, and a pivot member, wherein the bob member is connected to the pivot member by the connector member in a manner that allows the bob member to swing about the pivot member, and an equipment connecting mechanism adapted to operatively connect the drive system to a piece of equipment so that the piece of equipment can be driven by the drive system wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or maintain a pendulum motion, wherein the drive system is connected to a piece of equipment by the equipment connecting mechanism, and wherein the piece of equipment is a power generator.

In another aspect of the invention, a drive system for driving a piece of equipment comprises a pendulum mechanism comprising a bob member, a connector member, and a pivot member, wherein the bob member is connected to the pivot member by the connector member in a manner that allows the bob member to swing about the pivot member in a pendulum motion, wherein the bob member comprises a carriage, and wherein the carriage has a platform that supports a mass transfer mechanism, the mass transfer mechanism comprising a translating mass adapted to translate relative to the platform, and a control system that controls the operation of the drive system, wherein the control system comprises a detection system that detects a position of the bob member during the pendulum motion and that generates a detection signal that is provided to a controller, and wherein the controller controls the mass transfer mechanism in response to the detection signal.

In another aspect of the invention, a method of driving a piece of equipment comprise providing a drive system comprising a pendulum mechanism, the pendulum mechanism comprising a bob member, a connector member, and a pivot member, wherein the bob member is connected to the pivot member by the connector member in a manner that allows the bob member to swing about the pivot member; connecting the drive system to a piece of equipment to be driven; and translating a translating mass on the bob member in a manner that causes the bob member to swing in a pendulum motion or maintain a pendulum motion.

BRIEF DESCRIPTION OF THE DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

FIG. 3A is a schematic side view of the drive system of FIG. 1;

FIG. 3B is a schematic top view of the drive system of FIG. 1;

FIG. 8A is a schematic front view of the drive system of FIG. 7 with the swing in its rightmost position;

FIG. 8B is a schematic front view of the drive system of FIG. 7 with the swing in its leftmost position;

DESCRIPTION

The present invention relates to a drive system. In particular, the invention relates to a drive system that includes a pendulum mechanism that increases the efficiency and/or decreases energy consumption over conventional drive systems thereby reducing fossil fuel usage. Although the invention is illustrated and described in the context of being useful for driving equipment and/or energy storage, the present invention can be used in other ways, as would be readily apparent to those of ordinary skill in the art. Accordingly, the present invention should not be limited just to the examples and embodiments described herein.

Figure 1:
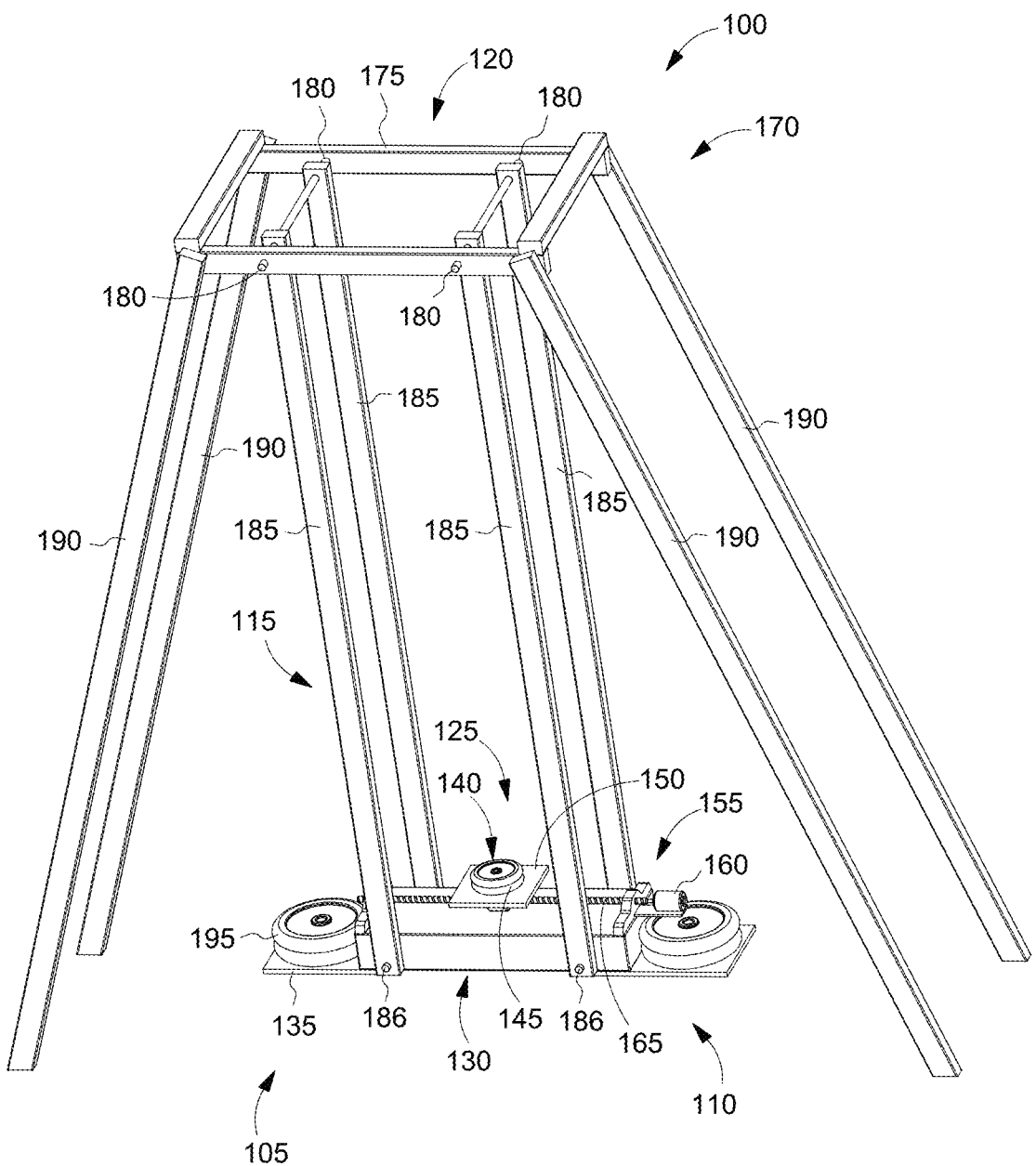
FIG. 1 is a schematic perspective view of a version of a drive system of the invention.
Figure 2:
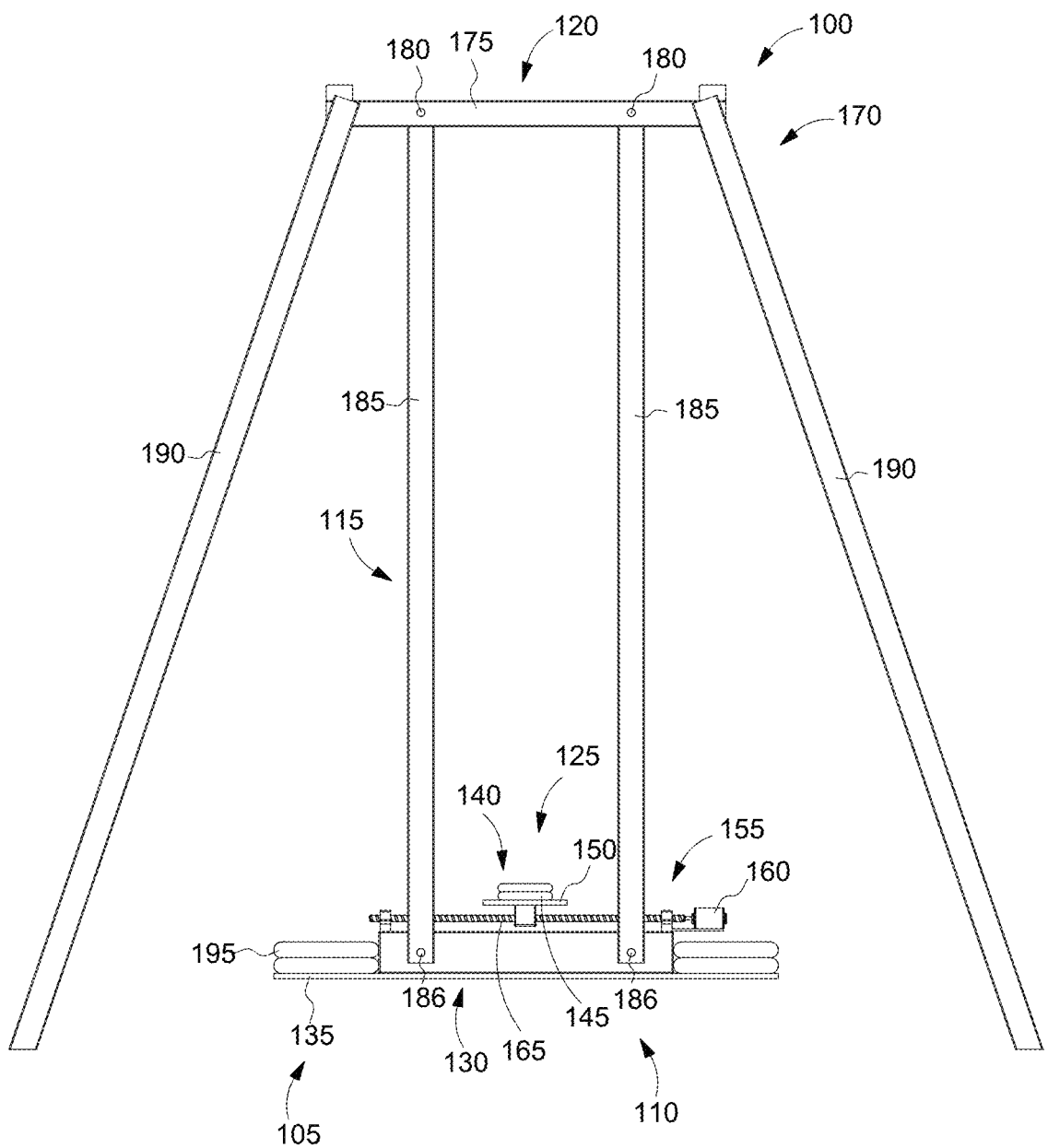
FIG. 2 is a schematic front view of the drive system of FIG. 1.

FIG. 1 shows a drive system 100 of the invention. The drive system 100 uses a pendulum mechanism 105 that takes advantage of the energy transfer and storage features inherent in a pendulum to drive a piece of equipment in an improved energy efficiency manner. The pendulum mechanism 105 of the drive system 100 is made up of a bob member 110 suspended by a connector member 115 from a pivot member 120 in a manner that allows the bob member 110 to swing to the left and the right. FIGS. 2, 3A, and 3B show additional view of the drive system 100 of FIG. 1.

In FIG. 1, the bob member 110 is shown hanging directly below the pivot member 120 in the equilibrium or resting position of the pendulum mechanism 105. When the bob member 110 is swung sideways, it is subject to a restoring force due to gravity that will accelerate the bob member 110 back towards the equilibrium position of FIG. 1. This force causes the mass of the bob member 110 to be moved past the equilibrium position and then continue to swing in the opposite direction where an opposite restoring force starts to operate on the bob member 110. These restoring forces cause the bob member 110 to oscillate or swing back and forth from the left to the right and back. As a pendulum swings, it is a constant state of transferring potential to kinetic energy and back. For example, when the bob member 110 is at its rightmost or leftmost position, it is at its maximum height relative to the equilibrium position. At this point, the bob 110 is at its maximum potential energy. That potential energy is converted to kinetic energy as the bob member 110 starts to swing back towards the equilibrium position. As the bob member 110 passes through the equilibrium position it is traveling at its fastest speed and is at its maximum kinetic energy. As the bob 110 then swings towards the other side and again gains height, the kinetic energy is transferred back to potential energy.

The time it takes for the bob member 110 to complete an entire swing is referred to as the period. The period is dependent upon the length of the connector member 115 and/or the distance from the pivot member 120 to the center of pivot on the carriage 130. In theory, with a massless connector, no friction, and no air resistance, the bob member 110 with continue to swing back and forth at the same period and amplitude. However, in the real world, these masses, frictions, and resistances contribute to an energy loss of the drive system 100. If input energy is supplied to pendulum mechanism 105 that is at least equal to energy loss, then the pendulum mechanism 105 can be kept in motion without loss of amplitude. Accordingly, with proper design, the kinetic energy of the pendulum mechanism 105 can be harvested or utilized in a way that improves energy efficiency, as will be explained.

In the version of FIG. 1, the input energy used to start and/or maintain the swinging motion of the pendulum mechanism 105 is provided by a mass transfer mechanism 125 located on the bob member 110. In the particular version shown, the bob member 110 includes a carriage 130 having a platform 135 that supports a translating mass 140 that linearly slides or otherwise translates along the platform 135 of the carriage 130 from the left to the right. The platform 135 can be any part of the carriage 130 that supports at least a portion of the weight of the mass transfer mechanism 125. For example, the platform 135 can be a flat surface, guide rails, or the like. The translating mass 140 moves relative to the platform 135. In the particular version of FIG. 1, the translating mass 140 is shown as one or more weights 145 on a support member 150 that translates relative the carriage platform 135. Alternatively, the translating mass 140 can take on any other and/or can incorporate one or more items to provide mass to the translating mass 140, such as a battery or other equipment. A linear actuator 155 is in communication with the translating mass 140 to cause the translating mass 140 to translate along the platform 135 of the carriage 130. In the particular version of FIG. 1, the linear actuator 155 comprises a motor 160 that causes the translating mass 140 to translate. For example, the motor 160 can be a rotary motor that operates a ball screw mechanism 165 connected to the translating mass 140 whereby rotation of the motor 160 in a first direction causes the translating mass 140 to move from left to right, and rotation of the motor 160 in a second direction causes the translating mass 140 to move from right to left, as would be understood by those in the art. Alternatively, the linear actuator 140 can be any other type of linear actuator system, such as a pneumatic and/or hydraulic system, or the like. Optionally, though not shown for clarity, one or more slide rails can be provided to help guide and/or stabilize the translation of the translating mass 140 on the carriage 130.

The linear actuator 155 causes the translating mass 140 to translate in coordination with the swinging of the bob member 110. The coordinated linear movement of the translating mass 140 on the carriage 130 causes the bob member 110, which includes the carriage 130 and the mass transfer mechanism 125, to start to swing and/or to continue to swing. This is analogous to a child swinging on a playground swing where the child is able to start and/or maintain the swinging movement by linear movement of the mass, such as the kicking of legs and/or the pulling on the chains of the swing. In the invention of FIG. 1, the movement of the translating mass 140 results in one or more forces being applied to the pendulum mechanism 105. By selectively coordinating those movements of the translating mass 140, the pendulum mechanism 105 can be made to swing.

Figure 4A:
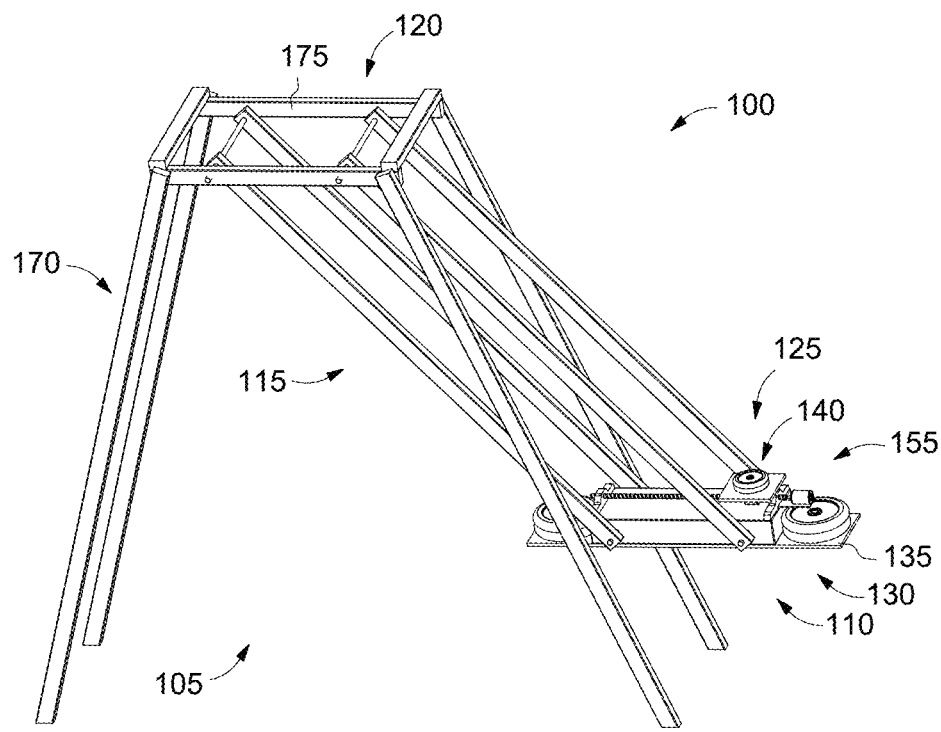
FIG. 4A is a schematic perspective view of the drive system of FIG. 1 in operation with the pendulum swung to its rightmost extent.
Figure 4B:
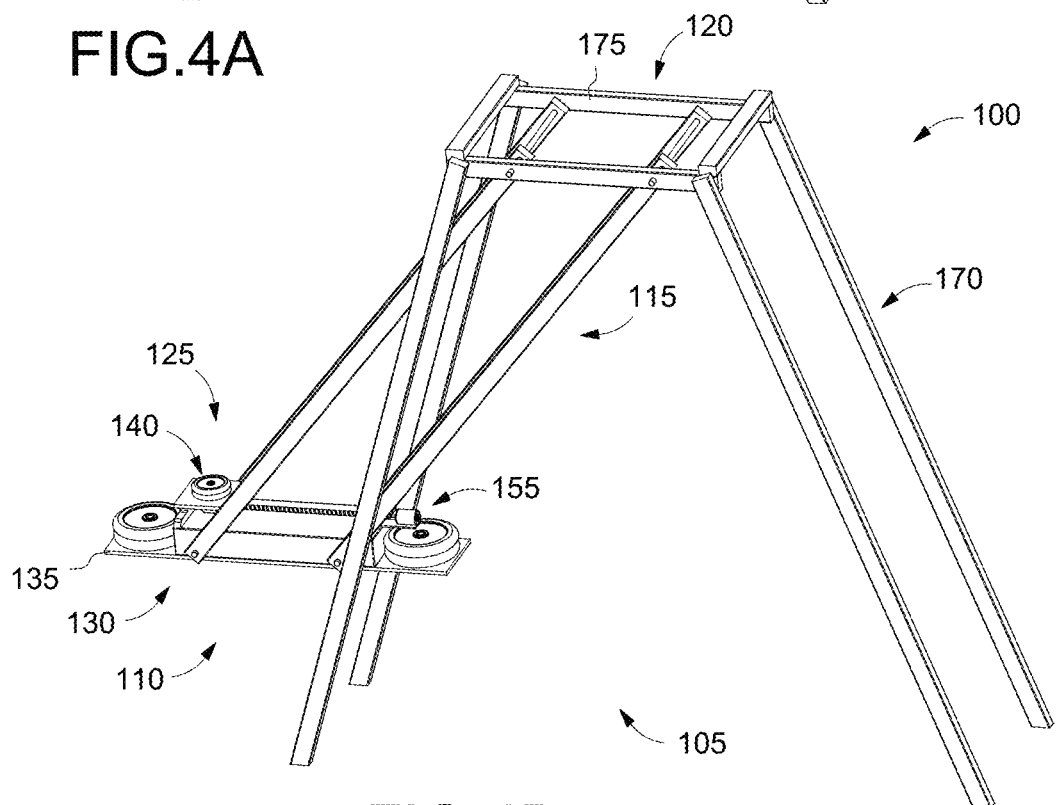
FIG. 4B is a schematic perspective view of the drive system of FIG. 1 in operation with the pendulum swung to its leftmost extent.

The movement and/or positioning of the translating mass 140 relative to the carriage 130 causes one or more forces to act on the pendulum mechanism 105 that can result in movement of the bob member 110. For example, a first force that can act on the bob member 110 relates to a position of the translating mass 140 relative to the center of gravity of the bob member 110 as a whole. In the equilibrium or resting position of FIG. 1, the translating mass 140 is centered on the carriage 130 with the center of gravity of the bob member 110 being directly below the pivot member 120. If the translating mass 140 is positioned on the right side of the carriage 130, the center of gravity of the bob member 110 would shift to the right which would force the bob member 110 as a whole to the left as gravity would urge the center of gravity of the bob member 110 to the a positive directly under the pivot member 120. In addition, the actual movement of the translating mass 140 causes one or more forces to be applied to the bob member 110. A first movement-related force is a start motion energy or force. As the translating mass 140 starts to move or accelerates, it exerts a force in the opposite direction that is applied to the carriage 130. For example, viewing FIG. 1, as the translating mass 140 moves from its rest position to the right, it exerts a force on the carriage 130 in the left direction. A second movement-related force is a stop motion energy or force. As the moving translating mass 140 is caused to stop, its deceleration exerts a force on the carriage 130 in the direction that the translating mass 140 had been moving. This can occur either by having the linear actuator 155 cause the translating mass 140 to stop or by having the translating mass 140 hit an abutment or stop. Accordingly, designed linear translation of the translating mass 140 can drive the pendulum mechanism 105 to swing back and forth, and continued translation can maintain swinging of the pendulum mechanism 105 at a desired amplitude. FIG. 4A shows the bob member 110 at the rightmost point of its swing path, and the translating mass 140 can be seen to be on the right side of the carriage 130. The translating mass 140 is then caused to move to the left side of the carriage 130 as the bob member 110 moves through the equilibrium position and towards the leftmost point of its swing path as shown in FIG. 4B. The amplitude of the swinging is the swing from left to right, and the maximum amplitude is the swing from the desired leftmost position to rightmost position of the bob member 110.

In the version of FIG. 1, a support structure 170 is provided that supports the connector member 115 and the bob member 110 at the pivot member 120 in a manner that allows them to operate as a pendulum. As shown, the support structure 170 includes a top support 175 that contains one or more pivots 180 or hinges that connect the connector member 115 to the top support 175. The connector member 115 can be one or more connectors 185, such as one or more bars, ropes, cables, or the like that extend from the one or more pivots 180 to the bob member 110 so that the bob member 110 can swing back and forth. The connector member 115 can be a connector 185, such as a single bar, rope, cable, or the like, or can be a plurality of connectors 185, such as a plurality of bars, ropes, cables, or the like. For example, in the particular version of FIG. 1, the connector member 115 comprises a front and back pair of connectors 185 in the form of bars that are space front to back. This arrangement provides front to back stability for the carriage 130. Also as shown in FIG. 1, the connector member 115 can additionally or alternatively include a left and right pair of connectors 185, such as a left and right pair of bars with one bar connected to the left side of the carriage 130 and one bar connected to the right side of the carriage 130. This arrangement also includes a pivotal hinge 186 connection for each of the left and right pair of connectors on the carriage 130. This arrangement allows the platform 135 of the carriage 130 to remain horizontal or parallel to the ground during the swinging process which allows the movement of the translating mass 140 to not be influenced as much by the force of gravity. The support structure 170 in the version of FIG. 1 optionally includes one or more legs 190 that support the top support 175 from the floor or ground. Alternatively, the top support 175 can be a ceiling, beam, or rafter.

The bob member 110 of the pendulum mechanism 105 has a mass made up of the carriage 130 and everything carried by or on the carriage 130, such as the mass transfer mechanism 125, the linear actuator 155, and any added mass 195. In the version of FIG. 1, the added mass 195 is shown in the form of weights, but the added mass can be in any form, such as additional equipment. The ratio of the mass of the translating mass 140 and the total mass of the bob member 110 can be selected to suit a desired purpose. The higher the ratio, the faster the swing motion of the bob member 110 can be generated, but a greater input energy will be required. In one version, the ratio of the mass of the translating mass 140 to the mass of the bob member 110 as a whole can be from about 1:64 to about 1:2, or from about 1:4 to about 1:32, or from about 1:8 to about 1:24, or from about 1:12 to about 1:20, or about 1:16.

The drive system 100 of the present invention offers improved energy efficiency in use. For example, once the pendulum mechanism 105 of the drive system 100 is swinging to its fullest desired extent, the only input energy that is needed is the energy needed to overcome any loss from connector member 115 mass, friction, air resistance, and the like. This input energy can be supplied by the mass transfer mechanism 125, and with proper design, the input energy can be very small in relation to the output energy capable of being generated by the drive system 100 while in operation. The input energy, such as the energy required to operate the motor 160 or other linear actuator 155 can be provided by solar power or other source or renewable or sustainable energy, in which case the drive system 100 can operate free of fossil fuels. Alternatively, solar energy or the like can be used to power a portion of the operation of the drive system 100, such as by being used to get the pendulum mechanism 105 up to its maximum swing. For example, in one particular use, solar energy or the like can be used to start the swinging of the bob member 110 and take it from its resting position to its maximum potential energy position, such as its rightmost or leftmost position, where it can be latched and stored in its potential energy position. Then, we the drive system 100 is needed to be used, the latch can be released and the potential energy can convert to kinetic energy or output energy from the drive system 100. A small amount of input energy can be provided to maintain the swinging of the pendulum mechanism 105 or the pendulum mechanism 105 can be allowed to freely swing on its own, thereby consuming no additional energy and only producing output energy until is settles to rest, at which time the entire process can be repeated. Even when solar energy or the like is not available, the drive system 100 can be used in a manner that saves energy. For example, the pendulum mechanism 105 can be loaded from its resting position to its potential energy position during off-peak hours or when an abundance of energy is available, and then the drive system 100 can be operated at that time when the output energy is needed or when it is more expensive.

The drive system 100 with a pendulum mechanism 105 can be used to drive or assist in driving a piece of equipment 500. The piece of equipment 500 can be any object that needs to be moved in order to operate or cause operation of a piece of equipment. The drive system 100 includes an equipment connecting mechanism 502 that is adapted to operatively connect the drive system to the piece of equipment 500 so that the piece of equipment 500 can be driven by the drive system 100. By driven it is meant that the piece of the equipment 500 moves or a portion of the piece of equipment 500 moves relative to another portion of the piece of equipment 500. For example, in the version of FIG. 5, the drive system 100 of the invention is used to drive a pump 505, such as a ground pump. In the particular version of FIG. 5, the drive system 100 is used to drive a pumpjack 510. The equipment connecting mechanism 502 serves to connect the drive system 100 to the pump 505 in such a way that the swinging of the pendulum mechanism 105 results in a pumping motion being performed by the pump 505.

Figure 5:
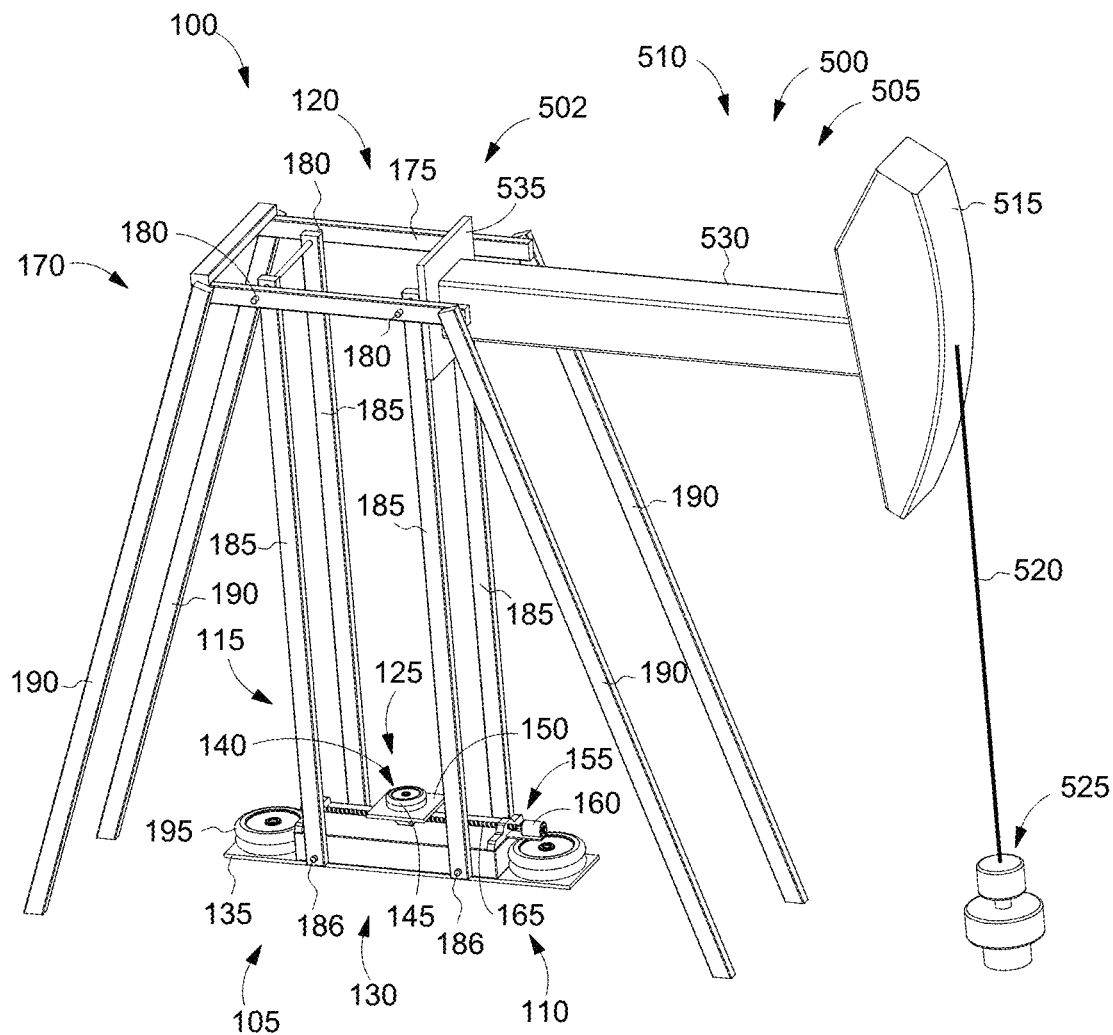
FIG. 5 is a schematic perspective view of a version of a drive system of the invention configured to drive a pumpjack device.

In the version of FIG. 5, the pumpjack 510, also known as a beam pump, walking beam pump, horsehead pump, nodding donkey pump, donkey pumper, rocking horse pump, grasshopper pump, sucker rod pump, dinosaur pump, big Texan pump, thirsty bird pump, oil horse, and/or hobby horse pump, is used to extract oil or water from below ground. The pumpjack 510 has an above ground portion that includes a horse head member 515 connected to a bridle 520 that is connected to tubing 525 that makes us a below ground pumping unit, as is conventionally known. In the invention of FIG. 5, the horse head 515 is connected to a horsehead beam 530 that is connected to the drive system 100 by the equipment connecting mechanism 502 in a manner that causes the horse head member 515 to move in response to movement of the pendulum mechanism 105 of the drive system 100. For example, in the version shown, the horse head beam 530 is connected to the connector member 115 by a connector plate 535. As the angle of the connector member 115 changes as the bob member 110 swings, the angle of the horse head beam changes.

Figure 6A:
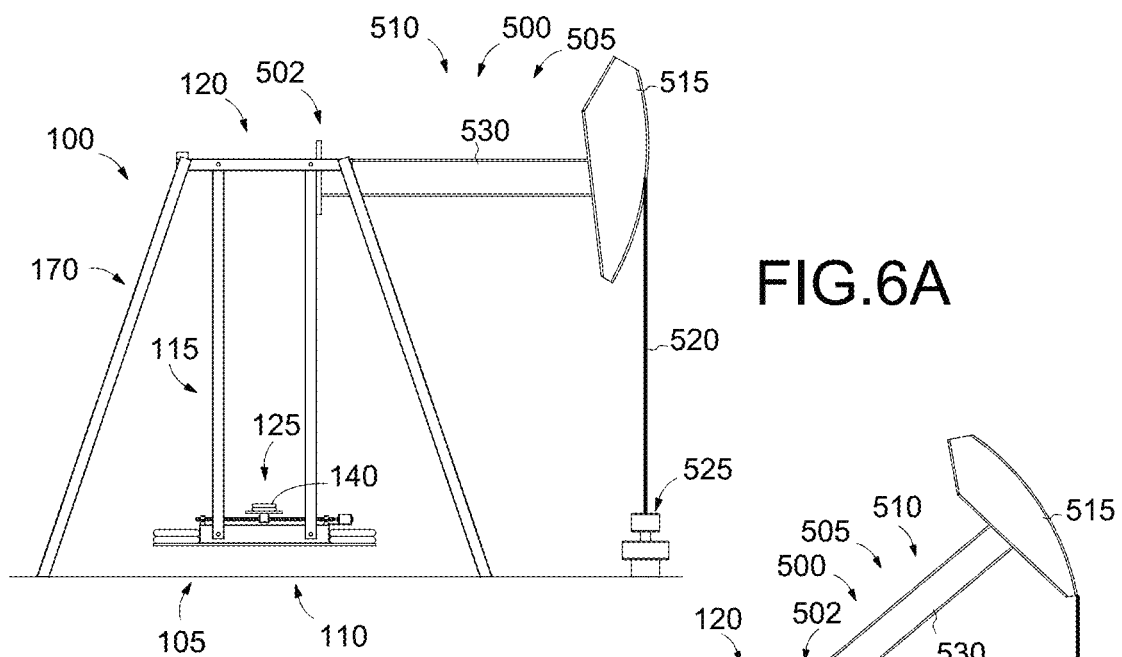
FIG. 6A is a schematic front view of the drive system of FIG. 5 in an initial position.
Figure 6B:
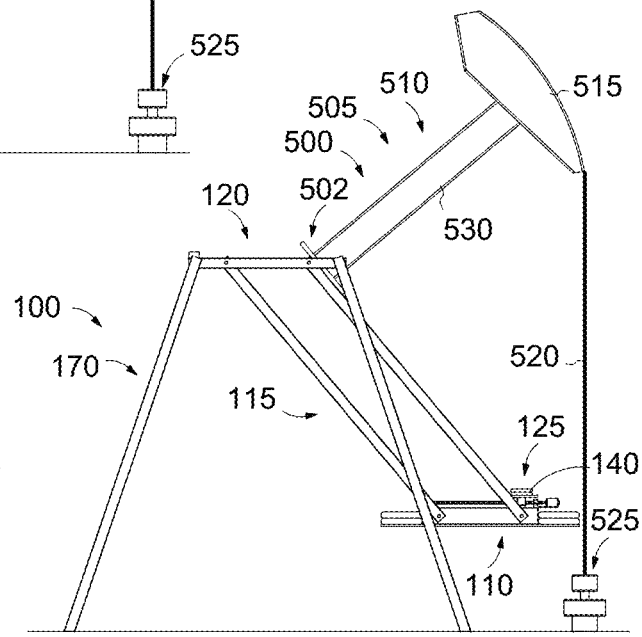
FIG. 6B is a schematic front view of the drive system of FIG. 5 with the pumpjack horse head in its highest position.
Figure 6C:
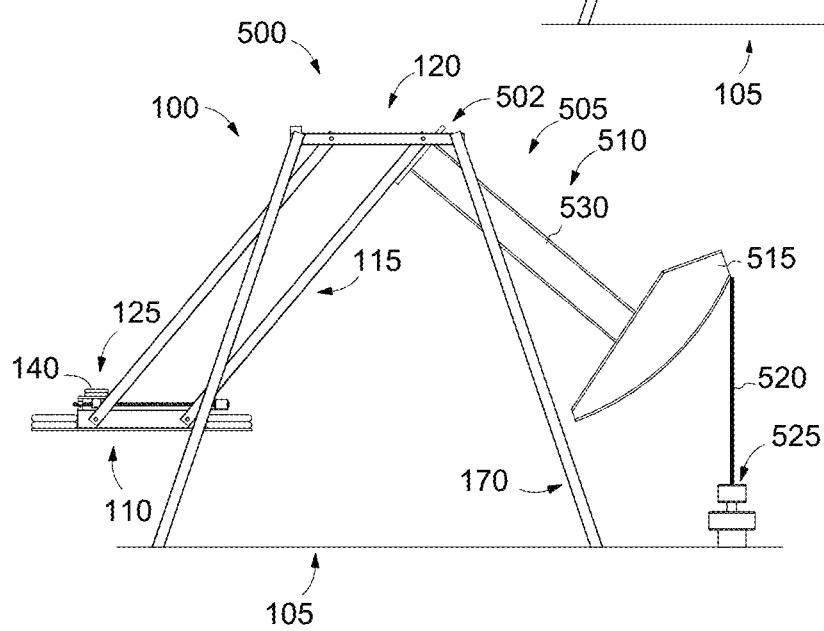
FIG. 6C is a schematic front view of the drive system of FIG. 5 with the pumpjack horse head in its lowest position.

The operation of the pumpjack 510 of FIG. 5 can be seen in FIGS. 6A, 6B, and 6C. FIG. 6A shows the pendulum mechanism 105 of the drive system in its equilibrium position. When the bob member 110 swings to the right, as shown in FIG. 6B, the horse head beam 530 is angled up, and the horse head member 515 is raised. When the bob member 110 swings to the left, as shown in FIG. 6C, the horse head beam 530 is angled down, and the horse head member 515 is lowered. Thus, the left to right swinging of the bob member 110 results in an oscillatory up and down motion of the horse head member 515 and the pumping tubes. This motion continues and the reciprocation motion causes oil or water to be drawn up in a piston-like manner.

The pumpjack 510 of FIG. 5 offers improved energy efficiency over conventional pumpjacks that use a motor to rotate a heavy weight and counter weight in addition to the energy needed to move the horse head member 515 in a highly inefficient system. With the present invention, once the pendulum mechanism 105 is swinging at its maximum amplitude, the input energy needed to keep the horse head member 515 moving up and down is merely the energy needed to keep the pendulum swinging plus the energy consumed by the movement of the horse head member 515, all of which can be provided by mass transfer mechanism 125. Since the pendulum mechanism 105 uses gravitational forces to its advantages rather than having to overcome gravity within the drive system, the drive system 100 of the present invention requires less energy to move the horse head member 515 than a conventional drive system for a pumpjack. When this energy savings is combined with the energy efficiency discussed above for driving the pendulum mechanism, the overall energy savings is significant. The energy savings can be further increased by using solar energy or other source of sustainable or renewable energy to provide the input energy and/or to ramp the pendulum mechanism 105 up from its resting position to a loaded position where the bob member 110 is positioned at its maximum potential energy position, as also discussed above.

Figure 7:
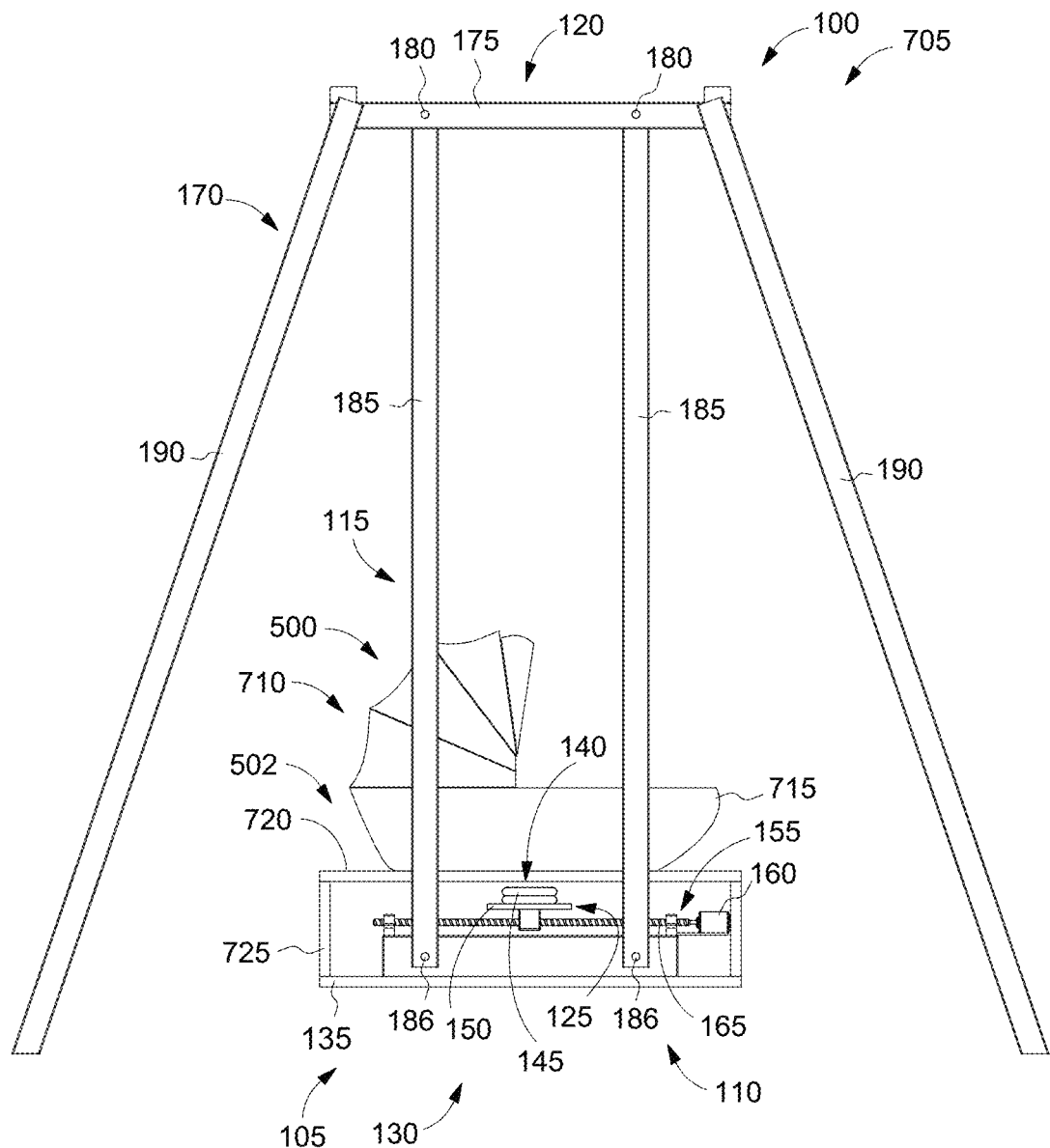
FIG. 7 is a schematic front view of a version of the drive system of the invention being used to drive a swing with the swing being shown in an initial, resting position.

Another version of a drive system 100 with a pendulum mechanism 105 that can be used to drive or assist in driving a piece of equipment 500 is shown in FIGS. 7, 8A, and 8B. For example, in the version shown, the drive system 100 with a pendulum mechanism 105 is a swing 705, such as a baby swing, and the piece of equipment 500 is a swinging object 710, such as a baby carrier 715. For example, the baby carrier 715 can be a bassinet, baby seat, or the like. The swinging object 710 can rest on the platform 135 of the carriage 130 or can otherwise be contacted by and moved by the bob member 110. Thus, in this version, the equipment connecting mechanism 502 is the carriage 130 itself and/or a surface carried by the carriage 130. In the version where the swinging object 710 rests on the platform 135 of the carriage 130, the swinging object 710 and anything carried by the swinging object 710, such as a baby, will contribute to the mass of the bob member 110. In this version, once the bob member 110 is swinging at its maximum extent, as shown in FIGS. 8A and 8B, the input energy needed to maintain the swinging of the singing object 710 is small. Another advantage of the use of drive system 100 as a baby swing is that the rhythmic sound made by the movement of the translating mass 140 can be soothing for a baby. In the particular version shown in FIGS. 7, 8A, and 8B, the baby carrier 715 or other swinging object 710 sits or is connected to a swinging object platform 720. For example, as shown, the swinging object platform 720 can be the top of an enclosure 725 that at least partially encloses the mass transfer mechanism 125 and/or electronics.

Figure 9:
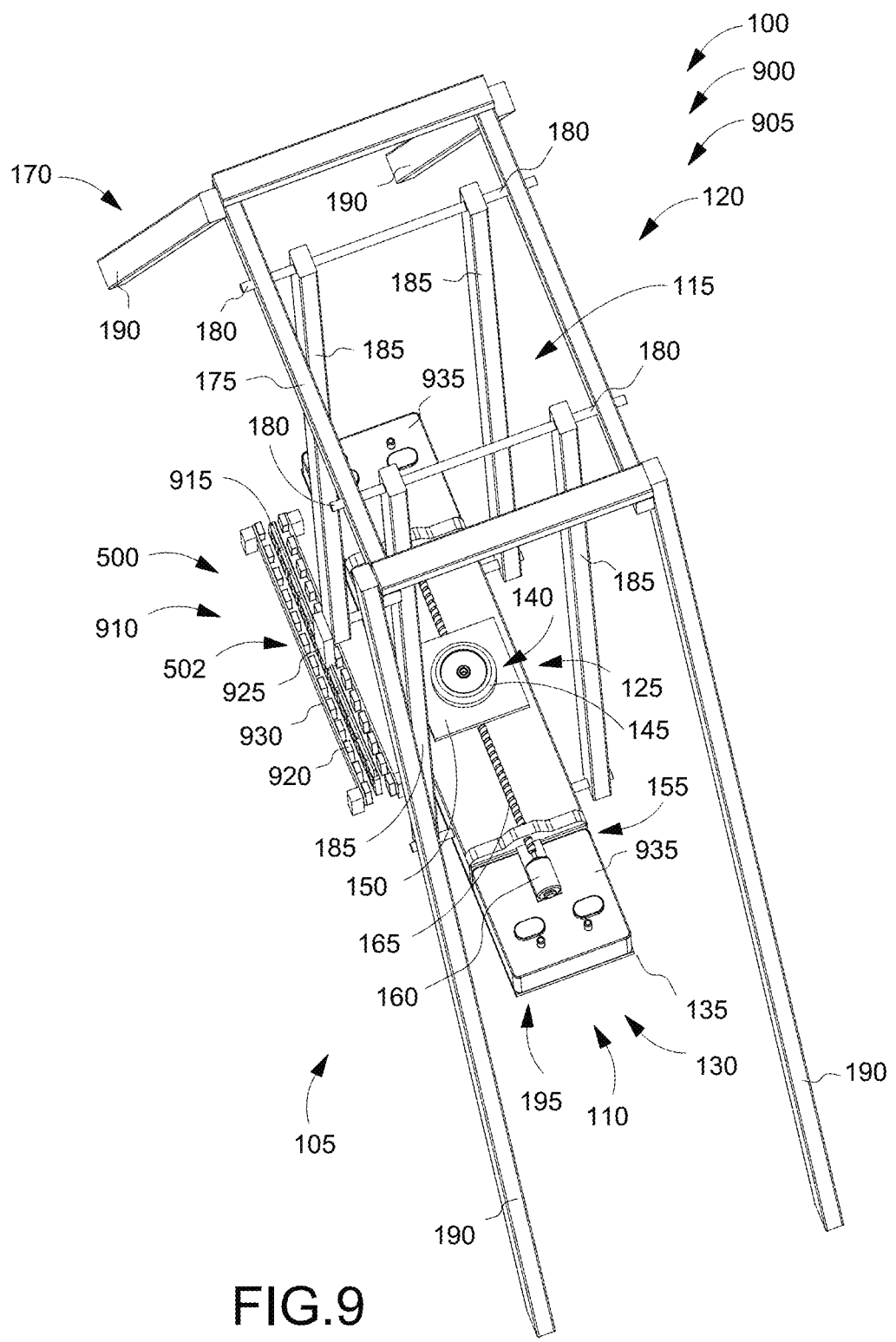
FIG. 9 is a schematic perspective view from above of a version of the drive system of the invention being used as an energy converter with the drive system being shown in an initial position.
Figure 10:
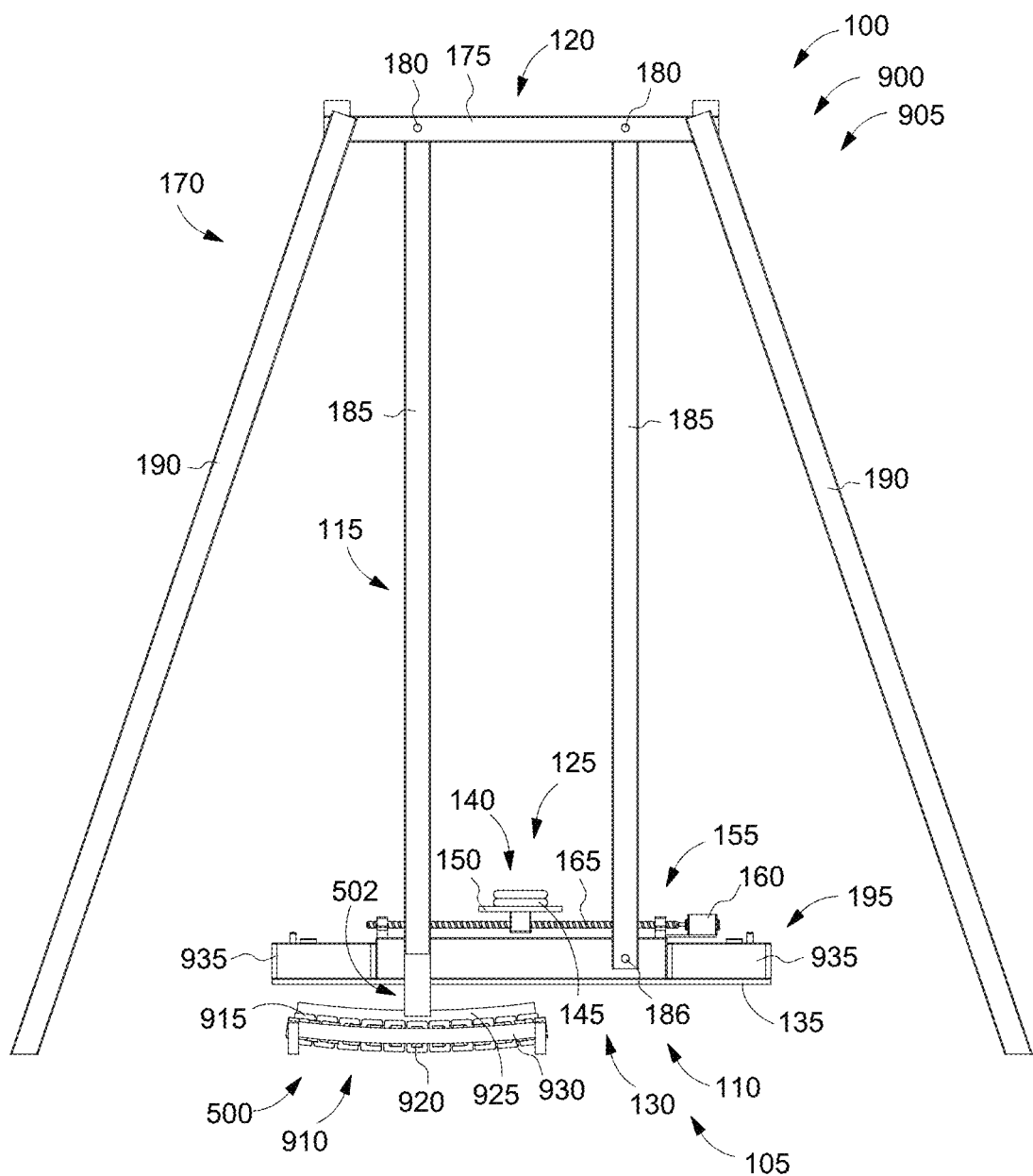
FIG. 10 is a schematic front view of the drive system of FIG. 9.
Figure 11:
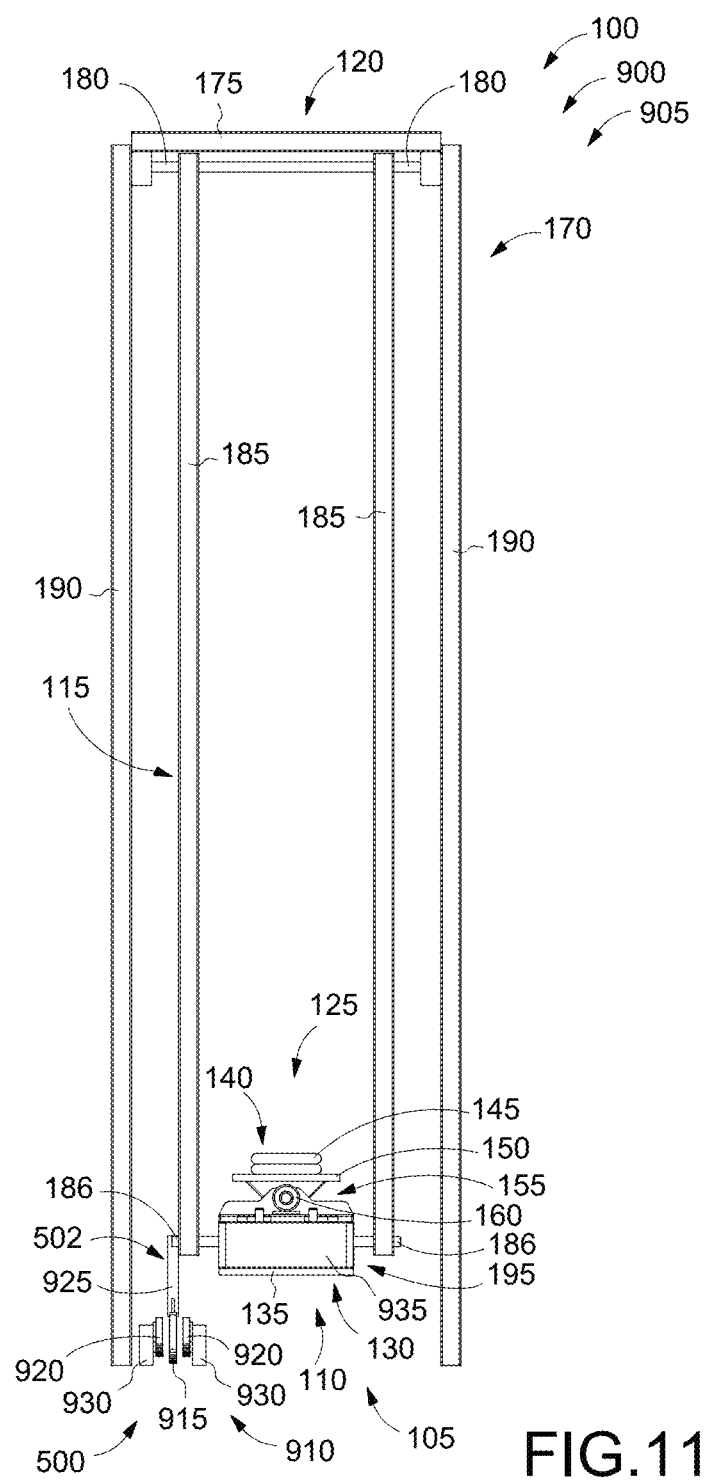
FIG. 11 is a schematic side view of the drive system of FIG. 10.

Another version of a drive system 100 with a pendulum mechanism 105 that can be used to drive or assist in driving a piece of equipment 500 is shown in FIGS. 9, 10, and 11. In this version, the drive system 100 is an energy conversion system 900, and the piece of equipment 500 that is being driven by the drive system 100 is a portion of the energy conversion system 900, the movement of which can be used to generate energy. In this version the equipment connecting mechanism 502 is the connection of the between the drive system 100 and the moving portion of the energy conversion system 900.

In the version of FIG. 9, the energy conversion system 900 is a power generator system 905. The power generator system 905 converts kinetic energy from the pendulum mechanism 105 into electricity or storable energy. The power generator system 905 is an axial flux electricity generator 910 that comprises a series of coils 915 and corresponding series of magnets 920 functionally coupled to the coils 910. The series of coils 910 is provided on a coil support member 925 that is carried by the bob member 110 of the pendulum mechanism 105. For example, the coil support member 925 can be connected by the equipment connecting mechanism 502 to the connector bar 185 or to the carriage 130 so that it moves and swings with the connector bar 185 or with the carriage 130. The series of magnets 920 is supported by a magnet support member 930 so that the series of magnets 920 are fixed relative to the moving bob member 110. For example, the magnet support member 930 can be fixed to the floor, ground, support structure 170 of the drive system 100, or any other structure that does not move with the bob member 110. As the bob member 110 swings, the series of coils 915 moves with respect to the series of magnets 920, generating current in each of the coils 915 by electromagnetic induction. The coils 915 can be configured in such a manner that they magnetically interact with as many magnets 920 or magnetic fields as possible in their oscillating motions during the swinging of the bob member 110. In the version shown, the coil support member 925 and the magnet support member 930 each have an arcuate shape so that the coils 915 and the magnets 920 can be arranged in an arcuate manner that corresponds the swing path of the bob member 110. In the version shown, the coil support member 925 is shown as passing through a pair of magnet support member 930 that each contain a series of magnets 920. Alternatively, there can be a single magnet support member 930. Also, in another version, the arrangement can be switched so that the magnets 920 are connected to and move with the connector bar 185, or on the bob member 110, while the coils 915 are fixed in position relative to the moving magnets 920. The axial flux electricity generator 905 can be positioned anywhere in the swing path of the pendulum mechanism 105 can be of any desired length. Optionally, multiple axial flux electricity generators 905 can be provided, such as one or more on the front of the carriage 130 or on a front connector bar 185 and one or more on the rear of the carriage 130 or on a rear connector bar 185. An example of a power generator can be found in United States Patent Application 2023/03961, which is incorporated herein by reference.

In use, one or axial more flux electricity generators 905 can be used to generate electricity from the movement of the bob member 110 of the pendulum mechanism 105. In one method of use, the mass transfer mechanism 125 can be used to position the pendulum in its rightmost or leftmost position and with its maximum potential energy. This loading can be performed by powering the linear actuator 155 from a renewable source or at an off-peak time, as discussed above. Once loaded, the one or more axial flux electricity generators 905 can be turned on and the bob member 110 can be allowed to swing to convert its potential energy to kinetic energy that will be used to generate electricity. The linear actuator 155 can be shut off or can be allowed to operate to maintain the swinging. In one version, the one or more axial flux electricity generators 905 can be used in combination with a different piece of equipment 500 that is being driven by the drive system 100. In one particular version, as shown in FIGS. 9, 10, and 11, one of more batteries 935 can be provided that are positioned on the carriage 130 with the batteries being chargeable by the electricity generated by the flux electricity generator 905. The one or more batteries 935 which will have significant mass, can be used instead of or in place of the added mass 195. In yet another version, the one or more batteries can be positioned to serve as the translating mass 140 of the mass transfer mechanism 125.

Figure 12:
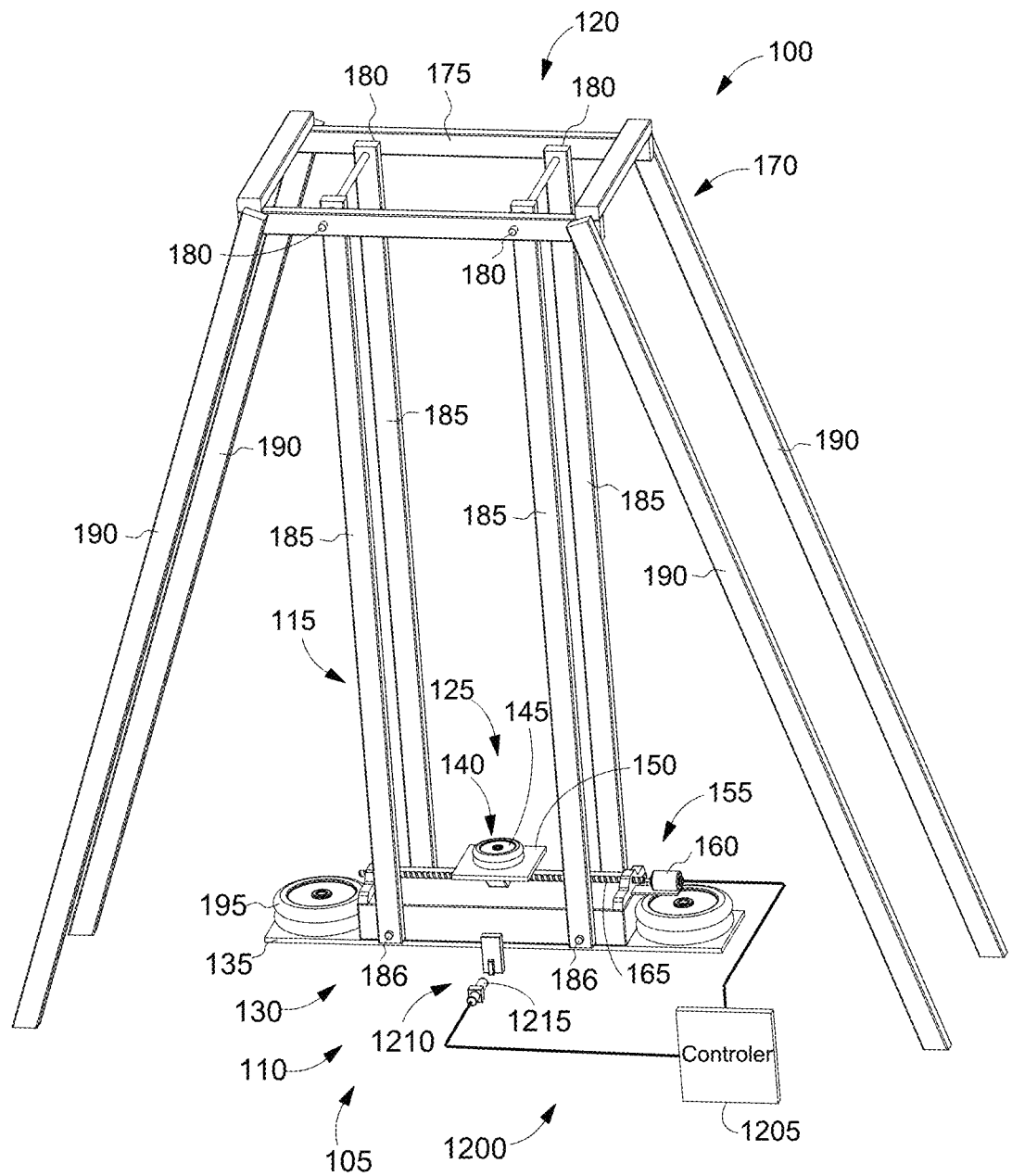
FIG. 12 is a schematic perspective view of another version of a drive system of the invention.

FIG. 12 shows another version of a drive system 100 with a pendulum mechanism 105 of the invention. In the version of FIG. 12, the drive system 100 includes a control system 1200 that monitors and/or controls the operation of the drive system 100 to improve the performance thereof. For example, the control system 1200 comprises a controller 1205 that can receive data from the 105 and/or can provide input to control operation of the pendulum mechanism 105.

In one version, as shown in FIG. 12, the control system 1200 of the drive system 100 includes a timing module within or in communication with the controller 1205. The timing module allows the controller 1205 to control operation of the pendulum mechanism 105 in a desired and advantageous manner. For example, the control system 1200 can comprise a period detection system 1210 that includes a detector 1215 that detects the position and/or the period of oscillation of the bob member 110 when the bob member 110 is swinging. In the version shown, the detector 1215 includes a sensor positioned so that a signal is generated and sent to the controller 1205 whenever the bob member 110 passes through its equilibrium or bottom position, as shown in FIG. 12. By measuring the amount of time that passes between signals, the controller 1205 can calculate the period of the swinging of the bob member 110. The controller 1205 is also in controlling communication with the linear actuator 155 of the mass transfer mechanism 125, such as by controlling operation of the motor 160. The controller 1205 can thus control the operation of the linear actuator 155 in accordance with and/or in response to the period and/or position of the bob member 110 as it swings. For example, the controller 1205 can adjust the speed of the translating mass 140 of the mass transfer mechanism 125 and/or can control the position at which the translating mass 140 changes direction.

Figure 13A:
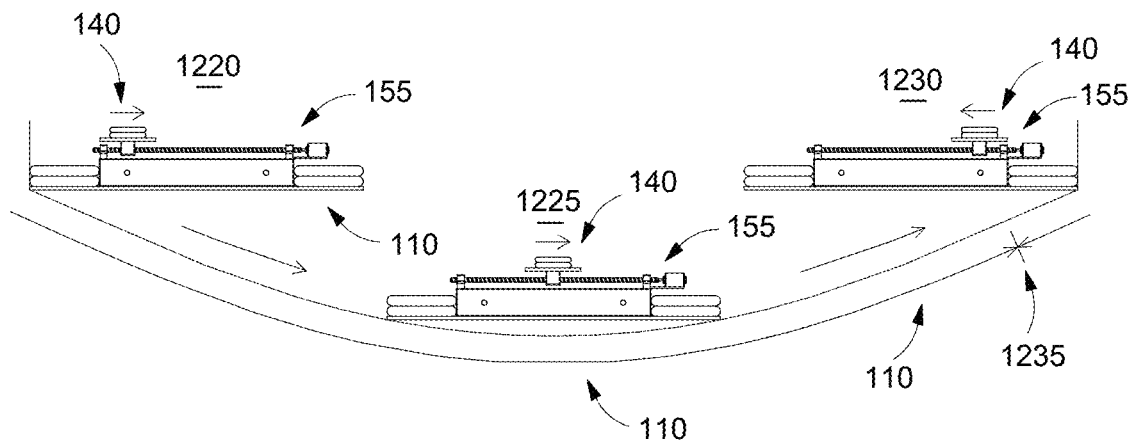
FIG. 13A is a schematic front view illustrating the operation of the drive system of FIG. 12 as the pendulum moves from its leftmost position to its rightmost position.
Figure 13B:
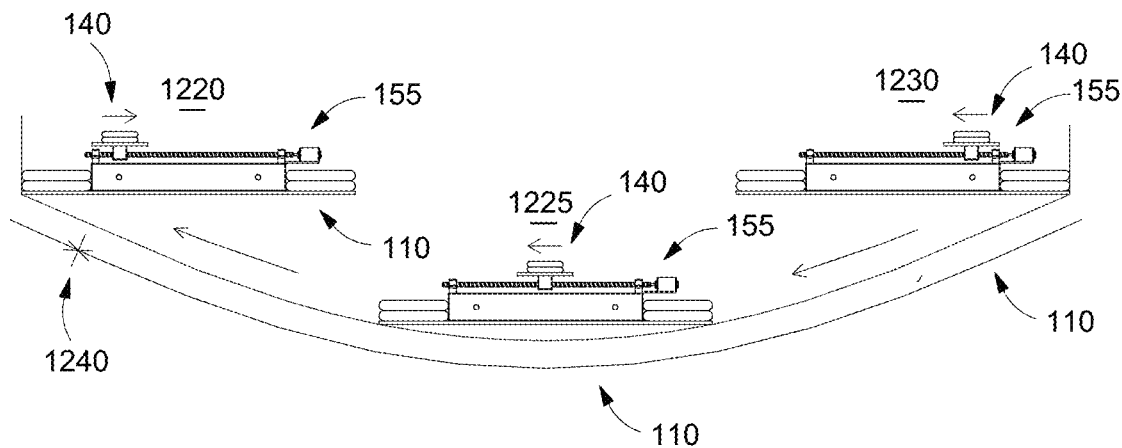
FIG. 13B is a schematic front view illustrating the operation of the drive system of FIG. 12 as the pendulum moves from its rightmost position to its leftmost position.

In one particular version, the controller 1205 can cause the translating mass 140 of the mass transfer mechanism 125 to translate in the direction of the swing bob member 110 and then the reverse its direction relative to the bob member 110 at a predetermined position within the period of the swinging of the bob member 110. For example, in one version, the translation of the translating mass 140 is moved as shown in FIGS. 13A and 13B. FIG. 13A shows time separated snap shots of the bob member 110, which includes the carriage 130 with the translating mass 140 thereon, along its swing path in its leftmost position 1220, its bottom position 1225, and its rightmost position 1230. As the bob member 110 swings from its leftmost position 1220, the translating mass is caused to move to the right at a speed that generally positions the translating mass 140 at the center of the bob member 110 when the bob member 110 is at the bottom position 1225. The translating mass 140 continues to move to the right at the same speed until the bob member 110 gets near to its rightmost position 1230. However, just before the bob member 110 reaches its rightmost position 1230, as can be determined by the timing module, the direction of movement of the translating mass 140 is reversed and the translating mass 140 starts its movement to the left at a right side reversing position 1235. By reversing the direction of translation of the translating mass 140 before the bob member 110 reaches its rightmost position 1230, the mass transfer mechanism 125 is able to take advantage of both the stop motion energy of the translating mass 140 stopping its movement in the right direction and the start motion energy of the translating mass 140 starting its movement in the left direction, both of which apply a force to the bob member 110 pushing it towards its rightmost position 1230. It has been determined that for a swing period of about 1.45 seconds, the mass reversal should occur at from about 0.05 seconds to about 0.2 seconds, or from about 0.07 to about 0.15 seconds, or from about 0.09 seconds to about 0.11 seconds, or about 0.100 seconds before the bob member 110 reaches its rightmost position. For a pendulum mechanism 105 with a different swing period, the mass reversal can be adjusted accordingly. For example, for a given swing period, the mass reversal can occur at a time before the bob member 110 reaches its rightmost position where the time is from about 3% to about 15% of the period, or from about 5% to about 10% of the period, or from about 6% to about 8% of the period, or at about 7% of the period.

FIG. 13B shows the process of FIG. 13A continuing as the bob member 110 swings back to the left. As the bob member 110 swings to the left the translating mass 140 moves to the left in the same but opposite manner as in FIG. 13A. As the bob member 110 approaches its leftmost position 1220, the translation of the translating mass 140 is again reversed so the translating mass 140 starts to move back to the right at the left side reversing position 1240, the timing and position of which corresponds to the reversal timing and position of the right side as shown and discussed in connection with FIG. 13A.

The control system 1200 can be any device capable of receiving input, performing calculations, performing calculations based on the input, producing an output signal, and/or producing an output signal as a result of the calculations. The controller 1205 may be a single controller or multiple controllers that are capable of communication with one another. The controller 1205 may be in the form of a central processor that is capable of interacting with a user via a keyboard, a graphical user interface, wireless communication, voice command, or any other manner. For example, the controller 1205 may be a personal computer, a laptop, a handheld device, a server, a network of servers, a cloud network, or the like. An operator may interact with the controller 1205 before, during, or after an equipment driving process. The controller 1205 can include various modules that allow it to perform calculations, algorithms, routines, and/or subroutines to process information and/or make determinations. The controller 1205 may further include other optional modules, such as artificial intelligence and/or machine learning modules that use algorithms to parse data, learn from the data, and then to make determinations and/or predictions based on what was learned.

Although the present invention has been described in considerable detail with regard to certain preferred versions thereof, other versions are possible, and alterations, permutations and equivalents of the versions shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Like numerals represent like parts from figure to figure. When the same reference number has been used in multiple figures, the discussion associated with that reference number in one figure is intended to be applicable to the additional figure(s) in which it is used, so long as doing so is not prohibited by explicit language with reference to one of the figures. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" should be understood to imply the inclusion of a stated element, limitation, or step and the exclusion of any other elements, limitations, or steps or the exclusion of any other essential elements, limitations, or steps, respectively. Throughout the specification, any discussion of a combination of elements, limitations, or steps should be understood to include (i) each element, limitation, or step of the combination alone, (ii) each element, limitation, or step of the combination with any one or more other element, limitation, or step of the combination, (iii) an inclusion of additional elements, limitations, or steps (i.e. the combination may comprise one or more additional elements, limitations, or steps), and/or (iv) an exclusion of additional elements, limitations, or steps or an exclusion of essential additional elements, limitations, or steps (i.e. the combination may consist of or consist essentially of the disclosed combination or parts of the combination). All numerical values, unless otherwise made clear in the disclosure or prosecution, include either the exact value or approximations in the vicinity of the stated numerical values, such as for example about +/−ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A drive system for driving a piece of equipment, the drive system comprising:
 a pendulum mechanism comprising a bob member, a connector member, and a pivot member, wherein the bob member is connected to the pivot member by the connector member in a manner that allows the bob member to swing about the pivot member; and
 an equipment connecting mechanism adapted to operatively connect the drive system to a piece of equipment so that the piece of equipment can be driven by the drive system, wherein the bob member comprises a carriage, and wherein the carriage has a platform that supports a mass transfer mechanism, the mass transfer mechanism comprising a translating mass and a linear actuator adapted to translate the translating mass relative to the platform, and wherein selective translation of the translating mass causes the bob member to swing in a pendulum motion or to maintain a pendulum motion.

2. The drive system according to claim 1 wherein the mass transfer mechanism provides sufficient energy to start the bob member swinging from rest.

3. The drive system according to claim 1 wherein the mass transfer mechanism provides sufficient energy to maintain the swinging of the bob member without loss of amplitude.

4. The drive system according to claim 1 wherein the mass transfer mechanism provides sufficient energy to maintain the swinging of the bob member and to drive the piece of equipment connected to the drive system.

5. The drive system according to claim 1 wherein the linear actuator causes the translating mass to translate in coordination with the swinging of the bob member.

6. The drive system according to claim 1 wherein the bob member swings from left to right, wherein the linear actuator causes the translating mass to translate from left to right in coordination with the swinging of the bob member, and wherein the linear actuator reverses a direction of translation of the translating mass before the bob member reaches a rightmost or leftmost position.

7. The drive system according to claim 6 wherein the linear actuator causes the translating mass to reverse the direction of translation from about 0.05 seconds to about 0.20 seconds before the bob member reaches its rightmost or leftmost position.

8. The drive system according to claim 1 wherein the ratio of the mass of the translating mass to the mass of the bob member is from about 1:64 to about 1:2.

9. The drive system according to claim 1 wherein the ratio of the mass of the translating mass to the mass of the bob member is from about 1:12 to about 1:20.

10. The drive system according to claim 1 wherein the connector member comprises at least a first pair of left and right bars.

11. The drive system according to claim 1 wherein the drive system comprises a control system that controls the operation of the drive system, wherein the control system comprises a detection system that detects a position of the bob member during the pendulum motion and that generates a detection signal that is provided to a controller, and wherein the controller controls the mass transfer mechanism in response to the detection signal.

12. The drive system according to claim 1 wherein the drive system is connected to the piece of equipment by the equipment connecting mechanism.

13. The drive system according to claim 12 wherein the piece of equipment is a pump.

14. The drive system according to claim 12 wherein the piece of equipment is a pumpjack that oscillates up and down in response to side to side swinging of the bob member.

15. The drive system according to claim 12 wherein the piece of equipment is a swing.

16. The drive system according to claim 12 wherein the piece of equipment is a power generator and wherein the equipment connecting mechanism connects the drive system to a moving part of a power generator, the movement of which generates power.

17. The drive system according to claim 12 wherein the power generator is an axial flux electricity generator comprising a series of magnets and coils.

18. A drive system for driving a piece of equipment, the drive system comprising:
a pendulum mechanism comprising a bob member, a connector member, and a pivot member, wherein the bob member is connected to the pivot member by the connector member in a manner that allows the bob member to swing about the pivot member in a pendulum motion, wherein the bob member comprises a carriage, and wherein the carriage has a platform that supports a mass transfer mechanism, the mass transfer mechanism comprising a translating mass adapted to translate relative to the platform; and
a control system that controls the operation of the drive system, wherein the control system comprises a detection system that detects a position of the bob member during the pendulum motion and that generates a detection signal that is provided to a controller, and wherein the controller controls the mass transfer mechanism in response to the detection signal.

19. The drive system according to claim 18 wherein the controller causes the translating mass to reverse its direction of translation when the bob member is at a predetermined position in its pendulum motion.

20. A method of driving a piece of equipment, the method comprising:
providing a drive system comprising a pendulum mechanism, the pendulum mechanism comprising a bob member, a connector member, and a pivot member, wherein the bob member is connected to the pivot member by the connector member in a manner that allows the bob member to swing about the pivot member;
connecting the drive system to the piece of equipment to be driven; and
translating a translating mass on the bob member in a manner that causes the bob member to swing in a pendulum motion or maintain a pendulum motion.

\* \* \* \* \*